Patented Feb. 14, 1950

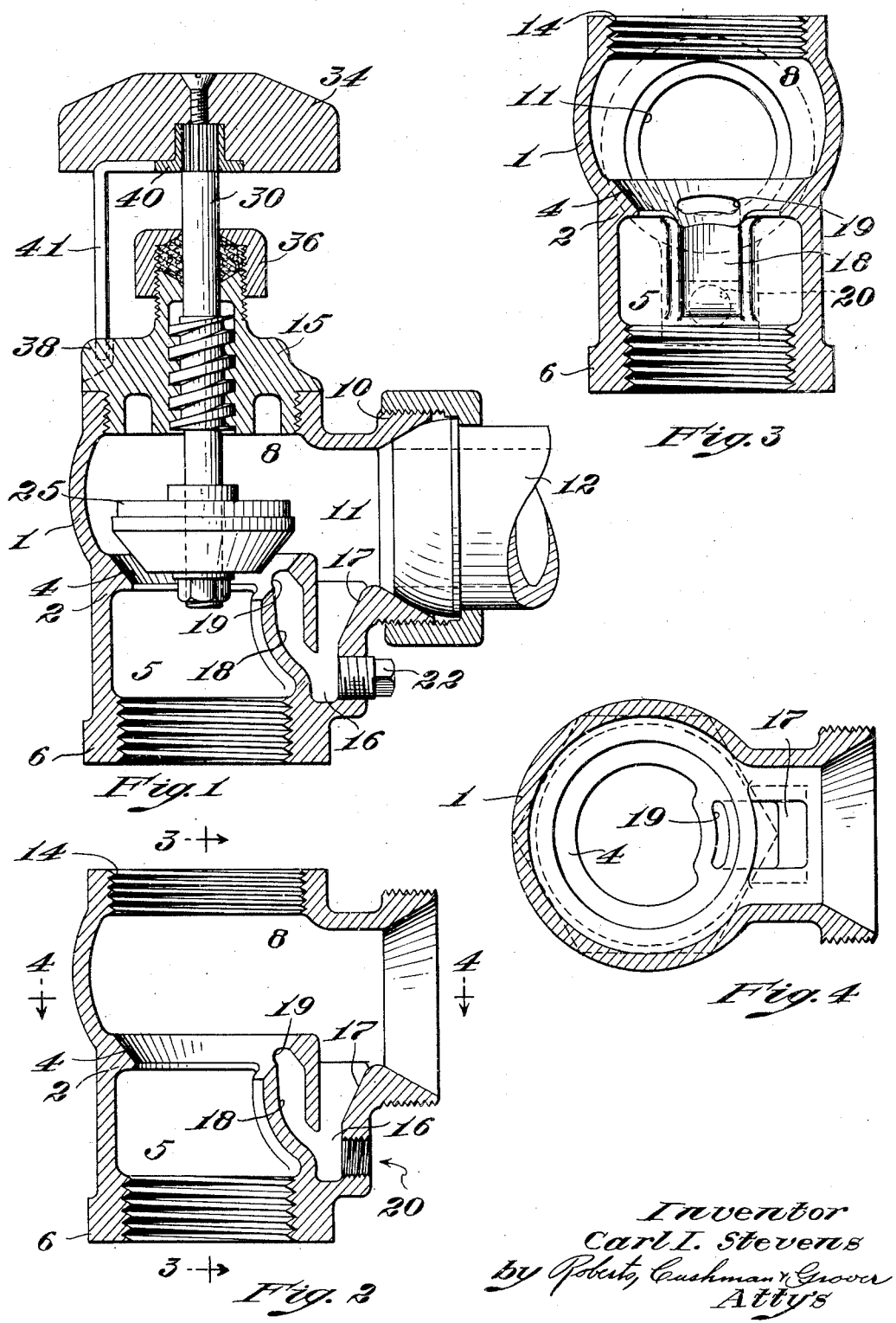

2,497,635

UNITED STATES PATENT OFFICE 2,497,635

MODULATING VALVE

Carl I. Stevens, Melrose, Mass.

Application May 28, 1948, Serial No. 29,748

2 Claims. (Cl. 137—103)

1

This invention relates to a valve suitable for a one-pipe steam system such, for example, as is customarily used in domestic heating, the present application being a continuation-in-part of my copending application Serial No. 695,234, filed September 6, 1946.

The principal objects of the invention are to provide a reliable and efficient modulating valve in which the ports of both the steam inlet and condensate return are controlled by one operation, and to provide a valve embodying a water seal through which the condensate must pass in returning to the boiler, and which is operative to permit the condensate to return into the supply line as steam is being admitted through the valve.

Further objects relate to various features of construction and will be apparent from a consideration of the following description and the accompanying drawings, wherein:

Fig. 1 is a vertical section through a valve constructed in accordance with the present invention;

Fig. 2 is a vertical section through the valve casing with the stem, bonnet and associated parts removed; and Figs. 3 and 4 are sections on the lines 3—3 and 4—4 respectively of Fig. 2.

The embodiment herein shown for the purpose of illustration comprises a valve casing 1 having a horizontal web or partition 2 formed with a central opening shaped to provide a conical valve seat 4, the partition 2 defining an inlet chamber 5 formed at its outer end with a conventional coupling member 6 for connection with a steam supply pipe, and an outlet chamber 8 having the usual laterally disposed coupling member 10 defining a steam outlet 11 connected with a pipe 12 which leads to a radiator or other steam-consuming device. The upper part of the casing is formed with a threaded opening 14 which receives the bonnet 15 (Fig. 1).

The valve seat 4 defines the main valve port between the inlet and outlet chambers and the body of the valve casing adjacent to the junction of the partition 2 and outlet 11 is formed with a generally U-shaped water seal or trap 16 having one leg or condensate inlet 17 communicating with the passage 11 and the other leg or condensate outlet 18 extending upwardly and terminating in an opening 19 formed within the confines of the conical valve seat 4.

The outer wall of the casing 1 which constitutes part of the trap 16 is drilled and tapped to provide a drain opening 20 (Fig. 2) which is normally closed by a removable plug 22 (Fig. 1). The construction and arrangement of parts are such that condensate in the pipe 12 flows into the outlet passage 11, through trap 16 and then trickles from the opening 19 over the inner wall of the arm 18 into the inlet chamber 5 and supply pipe associated therewith, thus permitting the condensate to return without interfering with the flow of steam through the main port.

The valve member 25 (Fig. 1) comprises a frusto-conical cap shaped squarely to seat on the beveled valve seat 4, thereby not only closing the main valve opening, but also the condensate or return opening 19. The cap or valve member 25 is secured to a valve stem 30 having the usual conventional threaded engagement with the bonnet 15 so that rotation of the stem 30 in one direction or the other moves the valve member 25 toward and away from its seat 4. The valve stem 30 projects through the bonnet 15 and carries the usual operating handle 34, a conventional packing gland 36 and associated parts being provided to insure a fluid-tight seal.

The marginal portion of the bonnet 15 is formed with a boss 38 which constitutes a stop or abutment for limiting the opening movement of the valve member 25. To this end the upper part of the stem 30 is provided with a sleeve-like member 40 having a depending finger 41 engageable with the boss 38, the finger 41 being so disposed that when the valve member 25 is in closed position the finger 41 is spaced from the stop 38 an angular distance corresponding to the maximum amount that the valve member 25 is to be opened under any condition of operation. Hence, when the valve stem 30 is rotated in a counterclockwise, valve-opening direction, the depending finger 41 strikes the stop 38 which limits further rotation and hence opening of the valve member 25.

When the valve member 25 is in closed position, it not only closes the main port but also the condensate opening 19; and opening of the valve member 25 not only opens the port from inlet chamber 5 to outlet chamber 8, but simultaneously opens the condensate return port 19 to permit condensate to flow back into the supply pipe or riser without interfering with steam or heating fluid passing through the inlet chamber 5, thus overcoming the well-known water-hammer effect. Both the main steam port and the condensate opening are thus controlled in one operation.

The usual domestic steam heating system embodies intermittent firing and in the normal use of the system the radiator valves are usually open. Heretofore with the conventional valve it has been extremely difficult, as a practical matter, to crack the valve so as to allow a minimum flow of steam into the radiator and simultaneously return of the condensate without encountering the well-known water-hammer effect. As above pointed out, the valve of the present invention permits the entry of steam and simultaneously return of condensate, regardless of the position of the valve member, without interfering with the normal flow of steam.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. A moldulating valve for a one-pipe steam system comprising a valve casing having a steam inlet port and a steam outlet port, a partition within said casing having an opening shaped to provide a frusto-conical surface which defines the valve seat of the main valve port, said partition defining an inlet chamber and an outlet chamber at each side of said valve port, said frusto-conical surface having a condensate opening formed within its confines, a U-shaped trap having one arm communicating with said outlet chamber at a point adjacent to said steam outlet port and its other arm communicating with said condensate opening so that condensate may flow from said outlet port through said trap and trickle down said frusto-conical surface to said steam inlet port, and a frusto-conical valve member movable toward and away from said valve seat so as simultaneously to close said valve port and condensate opening when said valve member is moved against said seat and open said condensate opening and valve port when moved away from said seat.

2. A modulating valve for a one-pipe steam system, comprising an angle valve casing having a steam inlet port at its bottom and a lateral steam outlet port, a partition within said casing intermediate the inlet and outlet ports defining an inlet chamber and an outlet chamber, said partition having a valve opening formed with a frusto-conical wall which provides a valve seat, said wall having a condensate opening within its confines at a point adjacent to said steam outlet port, a U-shaped trap integral with said partition and casing and having one arm communicating with said condensate opening and its other arm communicating with said outlet chamber at a point adjacent to said steam outlet port, and a frusto-conical valve member movable toward and away from said seat so as simultaneously to close said valve opening and condensate opening when said valve member is moved against said seat and open said condensate opening and valve port when moved away from said seat.

CARL I. STEVENS.

REFERENCES CITED

The following references are of record in the file of this patent:

UNITED STATES PATENTS

| Number | Name | Date |
|---|---|---|
| 893,527 | Lawler | July 14, 1908 |
| 935,113 | Judge | Sept. 28, 1909 |
| 2,274,436 | Spence | Feb. 24, 1942 |
| 2,357,097 | Funtan | Aug. 29, 1944 |